Patented June 12, 1945

2,378,006

UNITED STATES PATENT OFFICE 2,378,006

PROCESS FOR TREATING FATS AND FATTY OILS

Eddy W. Eckey, Wyoming, Ohio, assignor to The Procter & Gamble Company, Cincinnati, Ohio, a corporation of Ohio No Drawing. Application November 10, 1941,
Serial No. 418,592

14 Claims. (Cl. 260—410.7)

This invention relates to a process for altering the composition of fats and fatty oils which for convenience I shall refer to collectively hereinafter in the specification and claims as fats. More specifically the invention relates to a process for changing the fatty acid composition of glycerides contained in fats.

It is an object of my invention to provide an improved process whereby natural fats may be altered in physical properties.

A further object is to provide a process for changing the fatty acid composition of natural fats.

A special object is to treat glyceride fats, such as palm oil, so as to improve their characteristics and properties whereby they are made more suitable for use in edible shortenings.

It is known that natural fats are in part made up of fatty acids of more than one molecular weight and of more than one degree of saturation. It is known also that these fatty acids exist in fat largely in the form of mixed glycerides, that is, glycerides containing more than one kind of fatty acid in the individual triglyceride molecule. Furthermore, those versed in the art are aware that in most fats the fatty acid radicals are distributed among the individual triglyceride molecules not according to a random or chance arrangement but in a more orderly system in which there is a tendency for each individual glyceride molecule to contain two or three different kinds of fatty acid.

Because of this tendency to form orderly arranged mixed triglycerides, it is impossible to accomplish a marked modification in physical properties of fats such as palm oil or cottonseed oil by straight fractional crystallization or fractional crystallization from solvents into separate fractions containing respectively the predominant proportion of saturated and unsaturated glycerides. Methods have been proposed for the rearrangement of the molecular structure of fats by heat treatment, but such methods have been inadequate for effecting a radical change in the composition and physical properties of most fats.

In accordance with my invention, alteration of a fat or a mixture of fats with accompanying desired changes in physical properties is obtained by subjecting a mixture of the fat and free fatty acid derived from the same fat or other fat to heat treatment under a fractionating column under such temperature and pressure conditions that fractional distillation of the most volatile acids from the mix will take place while the refluxed acids continuously exchange with the more volatile combined fatty acids in the glycerides. Thus, as more fully hereinafter explained, a larger proportion of the more volatile fatty acids can be removed from the fat and greater change in properties effected than without the use of the fractionating column. Also, in the practice of my invention one has better control over the amount and kind of free fatty acid which is in reacting relationship with the triglyceride than in methods heretofore proposed.

The present invention is especially suited for replacing combined fatty acids in fats, with fatty acids of higher boiling point, and in accordance with my invention such replacement can be conducted to a far greater degree than in the methods of the prior art.

As far as I am aware the prior methods for effecting modification of fat characteristics by treatment of a fat with fatty acid at high temperature have included subjecting a mixture of the fat and fatty acids to heat treatment until desired equilibrium is reached, then distilling out the free fatty acids substantially completely, following which the residue is subjected to any subsequent treatment, such as caustic refining, bleaching, deodorization, hydrogenation, or other treatment necessary for conversion of the fat into one having suitable properties for a desired use. In such prior art practices, however, it is necessary that the fatty acid mixture which is reacted with the triglyceride be different than that from which the triglyceride is formed so that a material change in composition and properties may be effected. By virtue of the fractionating step and precision control employed by me the same fatty acid mixture as that combined in the fat may be employed.

Such prior methods of fat modification do not result in the maximum possible alteration in composition because in the products so treated it will be found that an equilibrium is established between the free fatty acid and the glyceride, and these respective portions of the mixture will be found to contain approximately the same proportion of the various acids existing in the mixture. Thus, for example, by methods of the prior art it would be impossible to effect much more than fifty per cent conversion of tripalmitin to triolein by heating a mixture of 50 per cent oleic acid and 50 per cent tripalmitin, because at equilibrium the fatty acids will be substantially equally proportioned between the acids in the free state and the acids combined as glycerides.

In accordance with the present invention much greater conversion of tripalmitin to triolein would be possible because in passing the vaporized fatty acids through a fractionating column and returning only the oleic acid to the reaction mixture the replaced palmitic acid would be continuously removed from the zone of reaction, thereby directing reaction toward complete conversion to triolein.

Of course the present invention is not confined to the use of any single fatty acid or any single triglyceride. Mixed triglycerides such as those occurring in the natural fats and mixtures of fatty acids obtained therefrom may be employed and desired changes in characteristics and properties accordingly obtained.

Let us now consider for example the application of my invention to palm oil and the manner in which this material may be altered. The fatty acids contained in palm oil (in free and combined state) will consist of about 48% oleic acid, 36% palmitic acid, 8% stearic acid, 7% linoleic acid, and 1% myristic acid. Such a high proportion of palmitic acid (a saturated solid fatty acid) in the glycerides of the palm oil results in a product which is much too hard to be usable in any great proportion in edible shortenings. Unfortunately not all of the palmitic acid is in the form of tripalmitin in the palm oil and cannot be removed by fractional crystallization, and for reasons above mentioned it is impractical to effect sufficient change in chemical and physical properties by prior art methods of fat rearrangement to make the oil suitable for use on a large scale in edible shortening.

In considering the process here under consideration as applied to palm oil, one should bear in mind that for any given pressure the boiling point of the palmitic acid will be lower than that of the oleic acid. Therefore by conducting the heat treatment and frictional distillation on a mixture of palm oil and palm oil fatty acids under such conditions that the palmitic acid and myristic acid will be permitted to distil out of the mixture while the higher boiling acids, including the unsaturated liquid oleic and linoleic acids, are returned to the boiling mixture to displace combined palmitic acid, the fat is reformed into one of entirely different characteristics. By the removal of displaced palmitic acid the fat is gradually converted into one which contains a far greater proportion of the more liquid fatty acids in the glycerides. Thus results a material softening or reduction of the melting point of the fat and accompanying increased usefulness in the shortening field.

The following example in which all parts are by weight will illustrate a method conducted along the above lines and while in general the practice shown therein may be considered my preferred practice, it is to be understood that the invention is not limited thereto but rather to the scope of the appended claims.

*Example.*—This example will illustrate a process for modifying palm oil. Into a still equipped with a suitable fractionating column and provisions for blowing with steam and adapted to be operated under subatmospheric pressure are charged 300 parts bleached crude palm oil, 350 parts fatty acids derived by the saponification and subsequent acidulation of the bleached crude palm oil, and about 1.2 parts (0.18%) of zinc oxide as catalyst. The pressure in the still is reduced to about 60 mm. of Hg pressure and the charge is heated to 280° to 290° C. This temperature is maintained for a period of about 2 hours during which time about 4.5% of steam is blown through the charge per hour.

In order to obtain a maximum alteration in the glyceride composition and change in physical properties of the oil in the two hour period, the fractionating column is operated under conditions that will permit the palmitic acid to pass through as a vapor but will effect condensation of the higher boiling fatty acids and return the same to the reaction mixture. These returned acids will react with the glycerides to liberate other acids and since these returned acids consist mainly of the unsaturated acids, the formation of a more unsaturated or lower melting product will result. In order to convert the altered fat into a product more suitable for consumption, it may be subjected to further purification treatment such as caustic refining, hydrogenation, deodorization, etc., if desired.

I have practiced my process in accordance with the above example with the use of a 11.1 acid value palm oil which, after caustic refining, had the following characteristics:

Iodine value _____ 49.6
Cloud point _____ °F____ 84.6

The fatty acids necessary in forming the charge were obtained by first saponifying some of the palm fat and subsequently splitting the same with a mineral acid such as hydrochloric acid thereby obtaining a mixture of the free acids contained in the palm oil which is to be rearranged. The mixture of these fatty acids with the palm oil had an acid value of about 114. During the distillation about 34 per cent of the charge was distilled out. This had an acid value of 220 and an iodine value of 2.5 (theoretical figures for palmitic acid are 219 and 0.0 respectively). The residue in the still had an acid value of 52.0. This residue was subjected to alkali refining, after which it was analyzed with the following results:

Iodine value _____ 75.8
Cloud point_____ °F____ 59.3

Comparison of this analysis with that of the palm oil prior to treatment by my process shows that a material change in characteristics had taken place. It will be noted that the iodine value or degree of unsaturation was increased 26.2 points, and the cloud point was reduced 25.3° F.

In the above specific illustration of the manner in which my invention may be practiced, I have given rather specific conditions and limitations. However, the invention is not so limited but many variations may be made without departing from the spirit of the invention.

For instance, I have given an example in which palm oil fatty acids derived from palm oil by saponification and acidulation are employed. Of course it is not necessary that this procedure be followed. Fatty acids from another source may be employed and if it is desired to conduct the rearrangement of a fat in the presence of a mixture of fatty acids derived from the same fat, then an alternative procedure is to subject the fat to partial hydrolysis in a manner known in the art prior to the alteration treatment. In other words the manner in which the acids are formed is not a limitation of the invention.

Since the desired product of my invention is rearranged glyceride, I prefer to work with mixtures which contain a major proportion of untreated glyceride and a minor proportion of fatty acid. However, when employing a fat and a mixture of fatty acids obtained from the same fat, it is not always possible to obtain the desired alteration with a relatively small amount of free fatty acid because the content of the replacing fatty acid (whose glyceride is desired) may be in very small proportion. Thus in the modification of palm oil, as in the above example, I find it expedient to employ a mixture containing more free fatty acid than glyceride. However, it is rarely necessary to increase the free fatty acid content above sixty per cent based on the total mixture of free acid and triglyceride, or, stated in a more positive way, the combined glycerin content, which is about ten per cent in the case of straight triglyceride, is practically always at least four per cent based on the mixture of glyceride and free fatty acid.

The fats which respond to my method of treatment and which undergo radical change in composition and properties when subjected thereto are the natural triglyceride fats and oils, including animal, vegetable and marine fats and oils such as tallow, cottonseed oil, coconut oil, palm oil, whale oil, fish oil, etc.

Whether or not a catalyst should be employed in conjunction with the heat treatment and simultaneous fractional distillation is dependent upon the final use designed for the product. The glyceride alteration and fractional distillation will take place in the absence of a catalyst, but of course the reaction proceeds considerably slower and therefore longer time will be necessary to effect the desired degree of modification. In the case of some fats the necessary prolonged treatment at high temperature required when no catalyst is used is injurious to color and may cause considerable polymerization and thermal decomposition. In such instances it is advisable to use a catalyst which will accelerate the reaction so that the fat is subjected to high temperature for a minimum length of time. For obvious reasons it is preferable to employ a catalyst but it should be understood that the present invention is not limited to this feature.

The catalysts which are preferred for use in the type of reaction herein involved are the metal oxides known in the art, those especially useful being the oxides of aluminum, magnesium and zinc.

In working with catalysts I have found that amounts of oxide up to 0.5% of the weight of the fat may be employed, but there is no particular advantage in employing quantities much in excess of .25%. Even small quantities of the catalyst, such as 0.05%, are effective in hastening the reaction, but I have found that the reaction proceeds at a rather low rate unless more than 0.1% of the metal oxide is employed. My preferred range of catalyst usage is from about 0.1% to about 0.5% metal oxide.

The temperature at which my process may be conducted will vary somewhat depending on the mixture of fat and fatty acids being treated. Of course it is essential that the temperatures employed be sufficiently high to vaporize the fatty acid under the existing pressure conditions and in addition be sufficiently high to bring about the simultaneous exchange of fatty acid in the triglyceride. Temperatures above 250° C. will be adequate for conducting the invention. Ordinarily the pressure conditions may be fixed so that temperatures substantially in excess of 300° C. are unnecessary. However, I do not wish to be limited to this range of temperature because temperatures in excess of 300° C. may be employed with success under some conditions. Most fats, however, will undergo undesired thermal decomposition and change at these higher temperatures and therefore as a rule they are to be avoided.

As indicated above, the reaction is preferably conducted under subatmospheric pressure primarily because the vaporization temperature of the fatty acids is thereby lowered and lower temperatures may therefore be used with the resulting production of products which have not undergone thermal decomposition to any great extent.

The use of steam or other inert gas such as nitrogen or carbon dioxide to assist in the distillation is likewise optional. I have found, however, that the use of steam has some catalytic effect and its use is therefore preferred.

The present invention has been so effective in changing the characteristics of fats that not only has there resulted an improvement in the adaptability of fats to various uses, but also there have been created new fields of application therefor.

For example, it has already been pointed out that the alteration in the chemical composition of certain fats such as palm oil in accordance with my invention will improve the consistency of the oil and make the same more suitable for use in shortening. The process may also be applied to coconut oil, palm kernel oil, and similar tropical nut oils, for example, so as to produce a product containing a larger proportion of a solid fraction which on separation from the treated fat will find use as a confectioner's hard butter in the preparation of confections. It is also possible to obtain a suitable hard butter by hydrogenation of the treated fat without fractional crystallization. Thus the present invention may be employed to soften or reduce the melting point of some fats or to harden or increase the melting point of others.

The method will also find use in the manufacture of improved drying oils from fish oil and soya bean oil. By the method of controlled alteration it is possible to increase the proportion of unsaturated triglycerides and thereby improve the drying properties of the oil.

Having thus described my invention, what I claim and desire to secure by Letters Patent is:

1. A process for altering the composition of a fat which comprises subjecting a mixture of fat and fatty acid to a temperature at which rearrangement of glycerides will take place, simultaneously vaporizing part of the fatty acids, fractionating the vaporized fatty acids, returning the less volatile fraction to the reaction zone to undergo further reaction with the glycerides and removing the more volatile fraction.

2. A process for altering the composition of a fat which comprises subjecting a mixture of fat and fatty acids obtained by hydrolysis of the same fat to a temperature at which rearrangement of glycerides will take place, simultaneously vaporizing part of the fatty acids, fractionating the vaporized fatty acids, returning the less volatile fraction to the reaction zone to undergo further reaction with the glycerides and removing the more volatile fraction.

3. A process for altering the composition of a triglyceride fat in which a higher boiling fatty acid displaces a lower boiling fatty acid, which comprises subjecting a mixture of a fat and a fatty acid having a boiling point above that of the fatty acid to be replaced in the fat to a temperature at which replacement and distillation of the free fatty acids will take place, passing the vaporized fatty acids into a fractionating column without substantial thermal decomposition, condensing the replacing fatty acid and returning same to the reaction zone, and permitting the replaced fatty acid to pass through the said column.

4. A process for altering the composition of a fat which comprises subjecting a mixture of a fat and an unsaturated fatty acid having a boiling point above that of combined saturated fatty acid in the fat to a temperature at which replacement and distillation of the free fatty acids will take place without substantial thermal decomposition, passing the vaporized fatty acids into a fractionating column, condensing the unsaturated fatty acid and returning same to the reaction zone, and permitting the saturated fatty acid to pass through the said column.

5. A process of altering the composition of a fat which comprises subjecting a mixture of a fat and saturated fatty acid having a boiling point above that of any of the combined fatty acids in the fat to a temperature at which replacment and distillation of the free fatty acids will take place without substantial thermal decomposition, passing the vaporized fatty acids into a fractionating column, condensing the saturated fatty acid and returning same to the reaction zone, and permitting the lower boiling fatty acid to pass through the said column.

6. A process for modifying the composition and properties of a triglyceride fat which comprises subjecting a fat to partial hydrolysis thereby forming a mixture of fat and fatty acid, subjecting the said mixture to a temperature at which free fatty acids will replace fatty acid combined in the triglyceride, simultaneously vaporizing free fatty acids, passing the fatty acid vapors into a fractionating column, condensing the higher boiling fatty acids and returning the same to the reaction zone and permitting the vapors of the lower boiling fatty acids to pass through the said column.

7. A process for altering the composition of a triglyceride fat in which a higher boiling fatty acid displaces a lower boiling fatty acid, which comprises heating a mixture of triglyceride fat and free fatty acid to a temperature above 250° C. at which rearrangement will take place, steam distilling the free fatty acids in the mixture under subatmospheric pressure, passing the vaporized fatty acids into a fractionating column, condensing the replacing fatty acid and returning same to the reaction zone, and permitting the replaced fatty acid to pass through the said column.

8. A process for altering the composition of a triglyceride fat in which a higher boiling fatty acid displaces a lower boiling fatty acid, which comprises heating under subatmospheric pressure a mixture of triglyceride, free fatty acid, and a metal oxide catalyst to a temperature at which free fatty acid will replace fatty acid combined in the triglyceride, simultaneously vaporizing free fatty acids, fractionating the vaporized fatty acids, returning the less volatile fraction to the reaction zone to undergo further reaction with the glycerides and removing the more volatile fraction.

9. A process for altering the composition of a triglyceride fat in which a higher boiling fatty acid displaces a lower boiling fatty acid, which comprises heating under subatmospheric pressure a mixture of triglyceride, free fatty acid, and from about 0.1 to about 0.5 per cent of a metal oxide catalyst to a temperature at which free fatty acid will replace fatty acid combined in the triglyceride, simultaneously vaporizing free fatty acids, fractionating the vaporized fatty acids, returning the less volatile fraction to the reaction zone to undergo further reaction with the glycerides and removing the more volatile fraction.

10. A process for altering the composition of a triglyceride fat in which a higher boiling fatty acid displaces a lower boiling fatty acid, which comprises heating under subatmospheric pressure a mixture of triglyceride, free fatty acid, and a metal oxide catalyst to a temperature above 250° C. but not substantially above 300° C., permitting free fatty acids to vaporize, fractionating the vaporized fatty acids, returning the less volatile fraction to the reaction zone to undergo further reaction with the glycerides and removing the more volatile fraction.

11. A process for altering the composition of a triglyceride fat in which a higher boiling fatty acid displaces a lower boiling fatty acid, which comprises heating a mixture of triglyceride fat and free fatty acid having a boiling point above that of combined fatty acid in said fat under subatmospheric pressure to a temperature at which free fatty acid will replace combined fatty acid without substantial thermal decomposition, passing an inert gas through the mixture to assist in vaporizing fatty acids, passing the vaporized fatty acids into a fractionating column, condensing the higher boiling fatty acid and returning same to the reaction zone, and permitting the lower boiling fatty acid to pass through the said column.

12. A process for altering the composition of a fat, in which process a higher boiling fatty acid displaces a lower boiling fatty acid, which comprises heating a mixture of triglyceride fat and free fatty acid having a boiling point above that of combined fatty acid in said fat under subatmospheric pressure to a temperature at which free fatty acid will replace combined fatty acid without substantial thermal decomposition, passing steam through the mixture to assist in vaporizing fatty acids, passing the vaporized fatty acids into a fractionating column, condensing the higher boiling fatty acid and returning same to the reaction zone, and permitting the lower boiling fatty acid to pass through the said column.

13. A process for altering the composition of a fat, in which process a higher boiling fatty acid displaces a lower boiling fatty acid, which comprises heating a mixture of triglyceride fat and free fatty acid having a boiling point above that of combined fatty acid in said fat in the presence of a molecular rearrangement catalyst under subatmospheric pressure to a temperature at which free fatty acid will replace combined fatty acid without substantial thermal decomposition, passing steam through the mixture to assist in vaporizing fatty acids, passing the vaporized fatty acids into a fractionating column, condensing the higher boiling fatty acid and returning same to the reaction zone, and permitting the lower boiling fatty acid to pass through the said column.

14. A process of altering the composition of a glyceride fat, which comprises subjecting a mixture of a glyceride fat and a saturated fatty acid having a boiling point above that of combined fatty acid in said fat, to a temperature and pressure at which replacement of free fatty acids will take place without substantial thermal decomposition, passing vaporized fatty acids into a fractionating device, condensing the saturated fatty acid and returning same to the reaction zone and permitting the lower boiling fatty acid to pass through said column.

EDDY W. ECKEY.

CERTIFICATE OF CORRECTION.

Patent No. 2,378,006. June 12, 1945.

EDDY W. ECKEY.

It is hereby certified that error appears in the printed specification of the above numbered patent requiring correction as follows: Page 2, first column, line 29, for the word "frictional" read --fractional--; page 3, second column, line 65, claim 3, strike out the words "without substantial thermal decomposition" and insert the same after "place" and before the comma in line 63, same claim; and that the said Letters Patent should be read with this correction therein that the same may conform to the record of the case in the Patent Office.

Signed and sealed this 23rd day of October, A. D. 1945.

Leslie Frazer

(Seal) First Assistant Commissioner of Patents.